US009626541B2

(12) United States Patent
Camp

(10) Patent No.: US 9,626,541 B2
(45) Date of Patent: Apr. 18, 2017

(54) METHODS, SYSTEM AND APPARATUS FOR CONDUCTING A POINT OF SALE TRANSACTION

(71) Applicant: eBay Inc., San Jose, CA (US)

(72) Inventor: Roy Leon Camp, Cupertino, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/860,445

(22) Filed: Sep. 21, 2015

(65) Prior Publication Data

US 2016/0012267 A1 Jan. 14, 2016

Related U.S. Application Data

(63) Continuation of application No. 13/722,369, filed on Dec. 20, 2012, now Pat. No. 9,141,841.

(51) Int. Cl.

| | |
|---|---|
| ***G06K 7/10*** | (2006.01) |
| ***G06Q 20/32*** | (2012.01) |
| ***G06Q 20/20*** | (2012.01) |
| ***G06Q 20/38*** | (2012.01) |

(52) U.S. Cl.

CPC ....... *G06K 7/10821* (2013.01); *G06K 7/1095* (2013.01); *G06Q 20/204* (2013.01); *G06Q 20/322* (2013.01); *G06Q 20/3276* (2013.01); *G06Q 20/387* (2013.01)

(58) Field of Classification Search

CPC ......................... G06K 7/1095; G06Q 20/3276

USPC .......................................................... 235/375

See application file for complete search history.

(56) References Cited

U.S. PATENT DOCUMENTS

| | | | | |
|---|---|---|---|---|
| 9,141,841 | B2 | 9/2015 | Camp | |
| 2004/0011868 | A1* | 1/2004 | Backlund ................ | G06F 3/147 235/383 |
| 2005/0274809 | A1 | 12/2005 | Colley | |
| 2006/0071077 | A1 | 4/2006 | Suomela et al. | |
| 2008/0005036 | A1 | 1/2008 | Morris et al. | |
| 2009/0274809 | A1 | 11/2009 | Patil et al. | |
| 2010/0096447 | A1 | 4/2010 | Kwon et al. | |
| 2012/0029994 | A1* | 2/2012 | Barkan .............. | G06Q 30/0207 705/14.25 |

(Continued)

FOREIGN PATENT DOCUMENTS

| | | | |
|---|---|---|---|
| CN | 104995645 | A | 10/2015 |
| JP | 2004005523 | A | 1/2004 |
| WO | WO-2014099661 | A1 | 6/2014 |

OTHER PUBLICATIONS

"U.S. Appl. No. 13/722,369, Examiner Interview Summary mailed Jan. 28, 2015", 3 pgs.

(Continued)

*Primary Examiner* — Toan Ly

(74) *Attorney, Agent, or Firm* — Schwegman, Lundberg & Woessner, P.A.

(57) ABSTRACT

A method, system, and apparatus to scan visual codes are described. An image of a first visual code marked on an item is captured and the image of the first visual code is displayed on an electronic screen of the apparatus for a point-of-sale terminal that is enabled to scan the image of the first visual code. A scan signal emitted by the point-of-sale terminal is detected, the scan signal indicating that the image of the first visual code was scanned. A second image of a second visual code is displayed on the electronic screen of the apparatus.

20 Claims, 7 Drawing Sheets

(56) References Cited

U.S. PATENT DOCUMENTS

| | | | | |
|---|---|---|---|---|
| 2012/0067943 | A1* | 3/2012 | Saunders | G06K 7/1095 235/375 |
| 2012/0067944 | A1* | 3/2012 | Ross | G06K 7/1095 235/375 |
| 2012/0228381 | A1 | 9/2012 | Drzymala et al. | |
| 2014/0084067 | A1 | 3/2014 | Vanderhulst | |
| 2014/0175161 | A1 | 6/2014 | Camp | |

OTHER PUBLICATIONS

"U.S. Appl. No. 13/722,369, Examiner Interview Summary mailed Aug. 26, 2014", 3 pgs.
"U.S. Appl. No. 13/722,369, Final Office Action mailed Nov. 13, 2014", 20 pgs.
"U.S. Appl. No. 13/722,369, Non Final Office Action mailed Jun. 19, 2014", 17 pgs.
"U.S. Appl. No. 13/722,369, Notice of Allowance mailed May 20, 2015", 10 pgs.
"U.S. Appl. No. 13/722,369, Response filed Feb. 13, 2015 to Final Office Action mailed Nov. 13, 2014", 10 pgs.
"U.S. Appl. No. 13/722,369, Response filed Sep. 12, 2014 to Non Final Office Action mailed Jun. 19, 2014", 11 pgs.
"International Application Serial No. PCT/US2013/074996, International Preliminary Report on Patentability mailed Jul. 2, 2015", 6 pgs.
"International Application Serial No. PCT/US2013/074996, International Search Report mailed May 27, 2014", 2 pgs.
"International Application Serial No. PCT/US2013/074996, Written Opinion mailed May 27, 2014", 12 pgs.
"Australian Application Serial No. 2013363295, First Examiner Report mailed Mar. 31, 2016", 3 pgs.
"Australian Application Serial No. 2013363295, Response filed May 3, 2016 to First Examiner Report mailed Mar. 31, 2016", 19 pgs.
"Chinese Application Serial No. 201380073278.5, Voluntary Amendment filed Feb. 19, 2016", with English translation of claims, 9 pgs.
"European Application Serial No. 13864365.5, Communication pursuant to Rules 161(2) and 162 EPC mailed Aug. 27, 2015", 2 pgs.
"European Application Serial No. 13864365.5, Response filed Feb. 19, 2016 to Communication pursuant to Rules 161(2) and 162 EPC mailed Aug. 27, 2015", 9 pgs.
"Canadian Application Serial No. 2,895,420, Office Action mailed Jun. 7, 2016", 3 pgs.
"European Application Serial No. 13864365.5, Extended European Search Report mailed Jun. 29, 2016", 10 pgs.
"Korean Application Serial No. 2015-7019362, Office Action mailed Sep. 8, 2016", with English translation of claims, 9 pgs.

* cited by examiner

200

| | 204 VISUAL CODE DATA FIELD | 208 OPTIONAL PRODUCT IDENTIFICATION INFORMATION | 212 GENERAL COUPON INFORMATION |
|---|---|---|---|
| COUPON 1 | XXXXX-XXXXX | GIFT CARD | $100 |
| COUPON 2 | XXXXX-XXXXX | DISCOUNT | -15% |
| COUPON 3 | XXXXX-XXXXX | 5305-10 | -$1.25 |
| COUPON 4 | XXX-XX-XXXX | CLUB CARD ID | |
| COUPON 5 | | | |

216

METHODS, SYSTEM AND APPARATUS FOR CONDUCTING A POINT OF SALE TRANSACTION

PRIORITY

This application is a continuation of and claims the benefit of priority to U.S. patent application Ser. No. 13/722,369, filed on Dec. 20, 2012, which is hereby incorporated by reference herein in its entirety.

TECHNICAL FIELD

The present application relates generally to point of sale transactions, and more specifically, in one example, to using an audible signal to conduct a point of sale transaction.

BACKGROUND

Visual codes are often used to uniquely identify items and goods available for sale. For example, the Universal Product Code (UPC) is a barcode symbology for uniquely identifying items. Other types of visual codes include EAN13 (European/International Article Number), EAN8, CODE39, CODE93, CODE128, Data Matrix, Sticky Bits, and matrix, or two-dimensional, barcodes, including Quick Response (QR) codes.

Point of sale terminals provide for the efficient purchasing of items and goods by scanning bar codes and/or other visual codes. A point of sale terminal often includes a scanning mechanism to, for example, scan a bar code and identify the item. The item identification may be used to determine a corresponding price for the item. A user may simply position an item such that the bar code is visible to the scanning mechanism. Once a bar code is correctly scanned, the point of sale terminal may process the bar code and signal the user to indicate that the bar code has been scanned. The next item may then be presented for scanning. The indicator may be an audible signal, such as an audible tone.

BRIEF DESCRIPTION OF THE DRAWINGS

Some embodiments are illustrated by way of example and not limitation in the figures of the accompanying drawings in which.

DETAILED DESCRIPTION

Figures 1, 2:
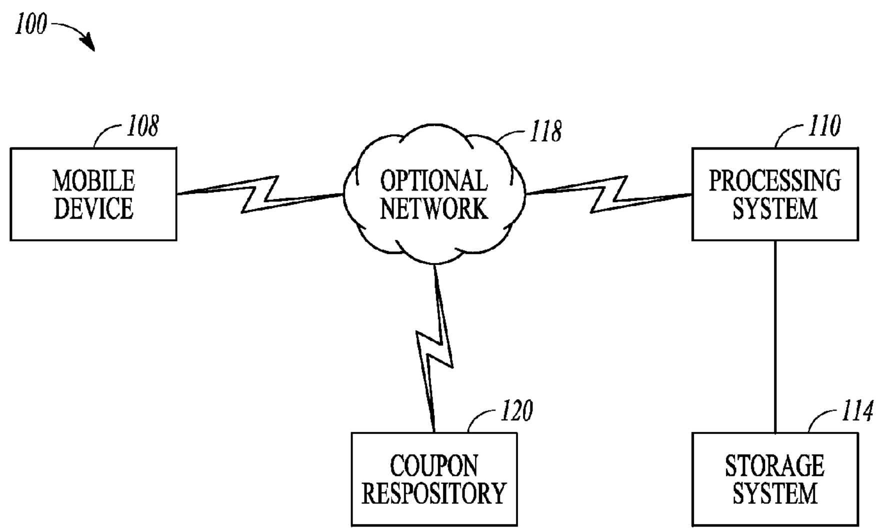
FIG. 1 is a block diagram of an example system, in accordance with an example embodiment, for scanning coupons.
FIG. 2 is an example representation of a coupon data structure for storing coupon information, in accordance with an example embodiment.

In the following detailed description of example embodiments, reference is made to specific examples by way of drawings and illustrations. These examples are described in sufficient detail to enable those skilled in the art to practice these example embodiments, and serve to illustrate how the invention may be applied to various purposes or embodiments. Other embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, a mechanism for scanning visual codes, including visual codes incorporated into coupons, is disclosed. Visual codes include, but are not limited to, EAN13 (European/International Article Number), EAN8, CODE39, CODE93, CODE128, Data Matrix, Sticky Bits, bar codes, QR codes, and the like. In one example embodiment, a point of sale terminal may include a scanning mechanism to scan a bar code and identify an item to be purchased. A user may simply position an item such that the bar code is visible to the scanning mechanism. Once the bar code is correctly scanned, the point of sale terminal may signal the user to indicate that the bar code has been scanned and the next item may be presented for scanning. The indicator may be an audible signal, such as an audible tone. While bar codes are utilized in the example embodiments described herein, other variations exist and are within the scope of the inventive subject matter. For example, a point of sale terminal may include a scanning mechanism to scan other visual codes, including a QR code. In one example embodiment, a point of sale terminal may include a scanning mechanism comprising a camera to scan a QR code and identify an item to be purchased.

Bar codes or other visual codes may be used to uniquely identify a coupon. Coupons, as defined herein, include coupons for a discount on a product or service for purchase, a gift card, a credit toward a purchase, a club card, a membership identification, a visual code on a product, electronic cash and currency, and the like. The coupon may be printed, or may be displayed on an electronic screen. For example, the electronic screen of a cellular telephone, personal digital assistant, mobile device, tablet computer and the like may be used to display a coupon. The coupon may be scanned by positioning the printed bar code or displayed bar code such that the bar code is visible to the scanning mechanism of a point of sale terminal.

FIG. 1 is a block diagram of an example system, in accordance with an example embodiment, for scanning coupons. In one example embodiment, system 100 may comprise a mobile device 108, a processing system 110, an optional coupon repository 120, and an optional network 118. Mobile device 108 may be a cellular telephone, personal digital assistant, mobile device, tablet computer, and the like. The processing system 110 may be a point of sale terminal and the like. Optional network 118 may be a local area network (LAN), a wireless network, a metropolitan area network (MAN), a wide area network (WAN), a wireless network, a network of interconnected networks, the public switched telephone network (PSTN), and the like. Optional coupon repository 120 may be a coupon database, a retailer website, a manufacturer website, a wholesaler website, a banking facility, and the like.

In one example embodiment, the processing system 110 may perform point of sale transactions and may scan items and goods for purchase. For example, the processing system 110 may scan bar codes located on items and goods for purchase. In one example embodiment, the processing system 110 may scan bar codes associated with coupons. In one example embodiment, the processing system 410 may scan bar codes displayed by the mobile device 108.

In one example embodiment, the mobile device 108 may obtain coupons from one or more optional coupon repositories. For example, the mobile device 108 may download a coupon(s) from a manufacturer website and/or currency from a banking facility.

In one example embodiment, the mobile device 108 may select and display a coupon on an electronic screen of the mobile device 108. In response to detecting a signal from the processing system 110 that indicates the preceding coupon was correctly scanned, the mobile device 108 may select and display another coupon on the electronic screen of the mobile device 108. If all pending coupons have been scanned, the mobile device 108 may optionally emit one or more scanning complete signals indicating that all of the pending coupons have been displayed and scanned. The one or more scanning complete signals emitted by the mobile device 108 may be one or more of a visual signal, a light signal, an audible signal, a motion signal, and the like. An audible signal may be one or more audible tones, and/or one or more spoken words.

In one example embodiment, processing system 110 may be a point of sale terminal. In one example embodiment, a coupon displayed on an electronic screen may be scanned by positioning the electronic screen such that the coupon bar code is visible to the scanning mechanism of a point of sale terminal. Once the bar code is correctly scanned, the point of sale terminal may signal to indicate that the bar code has been scanned correctly. The indicator may be a visual signal, a light signal (e.g., an infrared signal), an electro-magnetic signal, an audible signal, and the like. An audible signal may be one or more audible tones, and/or one or more spoken words. In one example embodiment, the point of sale terminal may emit an audible tone to indicate that the bar code of the coupon has been scanned correctly.

In one example embodiment, the point of sale terminal may emit a scan signal comprising data information. For example, the point of sale terminal may emit an infrared scan signal embedded with an identification number of the point of sale terminal. In one example embodiment, the point of sale terminal may emit an infrared scan signal comprising additional information pertaining to the point of sale terminal and/or the point of sale transaction.

In one example embodiment, the mobile device 108 displaying the coupon will select and display another coupon in response to detecting a signal from the point of sale terminal that indicates that the preceding coupon was correctly scanned. For example, the mobile device 108 may utilize a microphone to detect an audible signal, a camera to detect a visual signal, and/or an infrared receiver to detect an infrared signal.

In one example embodiment, once all pending coupons have been scanned, the mobile device 108 may emit a scanning complete signal indicating that all of the pending coupons have been displayed and scanned. The scanning complete signal emitted by the mobile device 108 may be one or more of a visual signal, a light signal, an audible signal, a motion signal, and the like. An audible signal may be one or more audible tones, and/or one or more spoken words. A motion signal may comprise applying a physical vibration to the mobile device.

In one example embodiment, the mobile device 108 may comprise a scanning mechanism for scanning visual codes including, but not limited to, product visual codes on items available for purchase. The scanning mechanism may be a camera, a bar code reader, and the like. The scanned product visual codes may be stored in the mobile device 108 as an image, a graphical representation of the visual code data, and/or the raw data represented by the visual code. In one example embodiment, the scanned product visual code(s) may be stored as a coupon in a coupon data structure.

In one example embodiment, the stored product visual codes may be displayed by a mobile device 108 and scanned by a point of sale terminal in a manner similar to the method of scanning coupons, as described more fully above. For example, stored bar code data may be regenerated as a bar code, displayed by the mobile device 108 and scanned by a point of sale terminal.

In one example embodiment, the stored product visual code(s) and/or information derived from the product visual code(s) may be transferred to a point of sale terminal and/or point of sale system via a communication link. For example, the stored product bar codes may be transferred to the point of sale system via an infrared signal. In one example embodiment, stored product codes and coupons may be transferred to a point of sale terminal and/or a point of sale system via a communication link.

FIG. 2 is an example representation of a coupon data structure 200 for storing coupon information, in accordance with an example embodiment. Each row 216 of the data structure corresponds to one coupon. Column 1 204 comprises the visual code data for the corresponding coupon and/or product, column 2 208 comprises optional identification information of the corresponding coupon and/or product, and column 3 212 comprises the general coupon information. General coupon information may be one or more of an amount of discount, an amount of store credit, an amount of currency, a membership identification number, product information, and the like. In one example embodiment, the coupon data structure may be loaded by a mobile device 108 from, for example, a website maintained by one or more issuers of coupons. Issuers of coupons may be product manufacturers, service providers, coupon distributors, retailers, wholesalers, banks, and the like.

Figure 3:
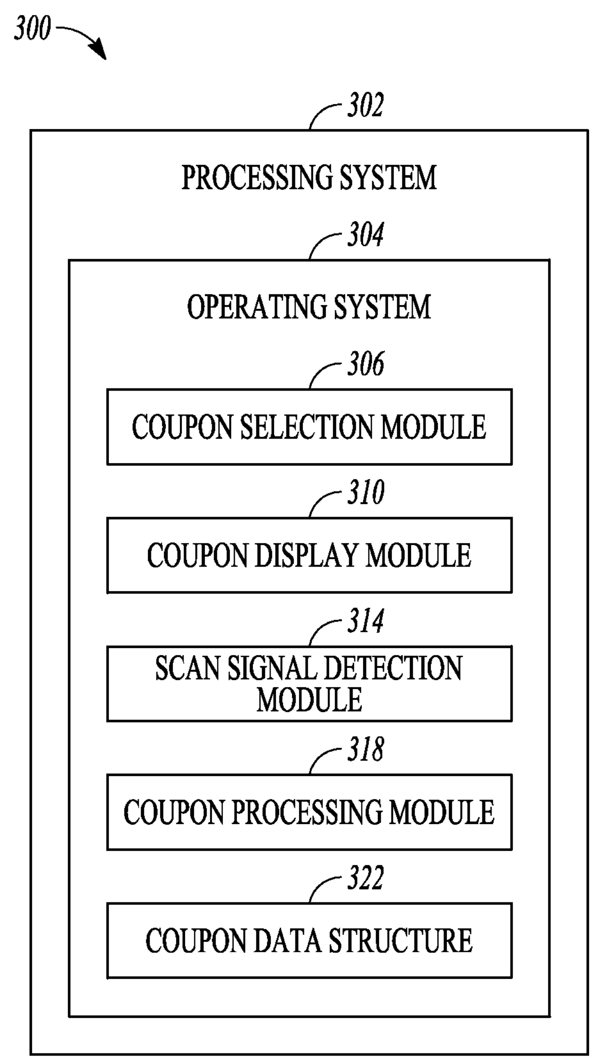
FIG. 3 is a block diagram of an example apparatus, in accordance with an example embodiment, for displaying coupons.

FIG. 3 is a block diagram of an example apparatus, in accordance with an example embodiment, for displaying coupons. In one example embodiment, the apparatus 300 may be a mobile device and may be used to select and display coupons in response to a signal from a point of sale terminal and, accordingly, is described by way of example with reference thereto.

The apparatus 300 is shown to include a processing system 302 that may be implemented on a client or other processing device that includes an operating system 304 for executing software instructions. In accordance with an example embodiment, the apparatus 300 includes a coupon selection module 306, a coupon display module 310, a scan signal detection module 314, and a coupon processing module 318. In accordance with an example embodiment, the apparatus 300 includes a coupon data structure 322. For example, a coupon data structure 322 may contain one or more coupons where each coupon comprises at least one visual code, including, but not limited to, a bar code.

The coupon processing module 318 may coordinate the loading of the coupon data structure 200 from, for example, a coupon website. The coupon processing module 318 may also coordinate the presentation of coupons on an electronic display in conjunction with the coupon data structure 200, the coupon selection module 306, the coupon display module 310, and the scan signal detection module 314. The coupon selection module 306 may access the coupon data structure 200 to obtain a coupon for presentation on the electronic display. The coupon display module 310 may format and display the coupon on the electronic display. The scan signal detection module 314 may detect a scan signal, indicating that a coupon was correctly scanned, and may inform the coupon processing module 318 of the detection of the scan signal. The coupon processing module 318 may then proceed with triggering the display of another coupon.

Figure 4:
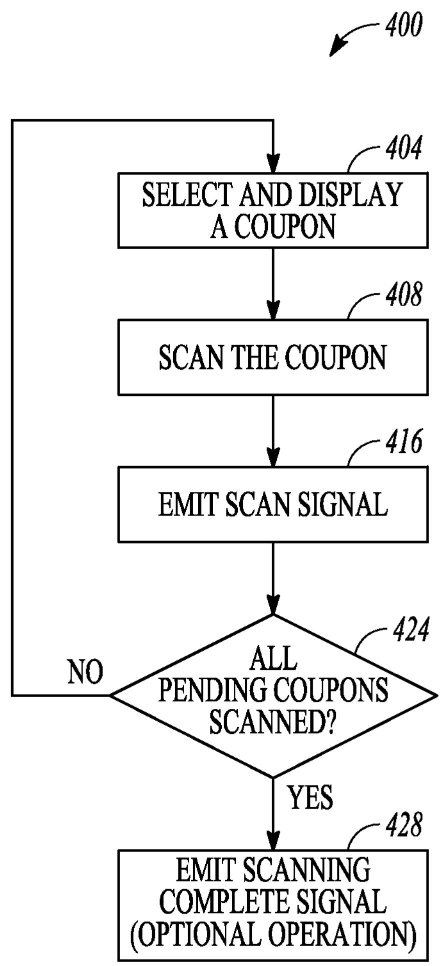
FIG. 4 is an example flowchart for a transaction method, in accordance with an example embodiment.

FIG. 4 is an example flowchart for a transaction method 400, in accordance with an example embodiment. In one example embodiment, one or more coupons may be scanned by positioning an electronic screen of, for example, a mobile device such that a displayed bar code is visible to a scanning mechanism of a point of sale terminal. A coupon may be selected and displayed on the electronic screen (operation 404). The bar code may be scanned one or more times by the point of sale terminal until the bar code is successfully read (operation 408).

In one example embodiment, if the bar code is not successfully read within a predefined period of time, the display of the bar code may be altered to facilitate proper scanning of the bar code. For example, the location and/or size of the barcode on the display may be altered, an intensity level of a display backlight may be adjusted, a color, contrast, and/or brightness of the bar code may be adjusted, and the like.

If the coupon is successfully read, the point of sale terminal may emit a scan signal to indicate that the bar code has been scanned correctly (operation 416).

In one example embodiment, the mobile device 108 may repeatedly perform a test to determine if a scan signal is detected while a coupon is displayed (not shown). In one example embodiment, a scan signal is detected if identification information embedded in the received scan signal matches identification information provided by a user. In response to detecting a scan signal from the point of sale terminal (indicating that the preceding coupon was correctly scanned), a test may be performed by the mobile device 108 to determine if all pending coupons have been scanned (operation 424). If all pending coupons have not been scanned, the mobile device 108 may transition to operation 404 and may select and display another coupon. If all pending coupons have been scanned, the mobile device 108 may optionally emit one or more scanning complete signals indicating that all of the pending coupons have been displayed and scanned (operation 428). The one or more scanning complete signals emitted by the mobile device 108 may be one or more of a visual signal, a light signal, an audible signal, a motion signal, and the like. An audible signal may be one or more audible tones, and/or one or more spoken words.

In one example embodiment, a user may enter identification information for a point of sale terminal into the mobile device 108. For example, if the user is using point of sale terminal no. 7, the user may enter the number 7 into the mobile device 108. In one example embodiment, a scan signal is detected if identification information embedded in the received scan signal matches the identification information provided by the user.

Figure 5:
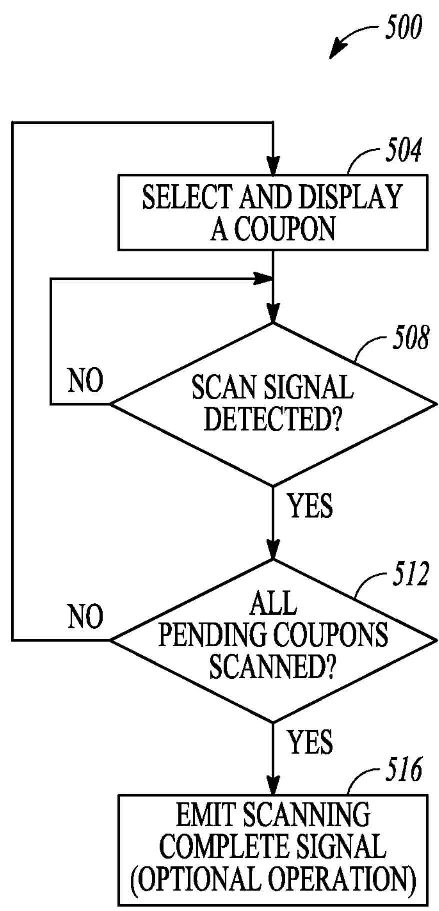
FIG. 5 is an example flowchart for a coupon displaying method, in accordance with an example embodiment.

FIG. 5 is an example flowchart for a coupon displaying method 500, in accordance with an example embodiment. In one example embodiment, a coupon may be selected and displayed on the electronic screen of, for example, a mobile device 108 (operation 504). The mobile device 108 may perform a test to determine if a scan signal is detected (operation 508). If a scan signal is not detected, the test to determine if a scan signal is detected may be repeated (operation 508).

If a scan signal is detected (indicating that the preceding coupon was correctly scanned), a test may be performed to determine if all pending coupons have been scanned (operation 512). If all pending coupons have not been scanned, the mobile device 108 may transition to operation 504 and may select and display another coupon. If all pending coupons have been scanned, the mobile device 108 may optionally emit one or more scanning complete signals indicating that all of the pending coupons have been displayed and scanned (operation 516). The one or more scanning complete signals emitted by the mobile device may be one or more of a visual signal, a light signal, an audible signal, a motion signal, and the like. An audible signal may be one or more audible tones, and/or one or more spoken words.

In one example embodiment, one or more additional point of sale terminals may be located in proximity to the point of sale terminal that is scanning coupons. In this embodiment, the audible signals of the one or more additional point of sale terminals may reach the location of the point of sale terminal that is scanning coupons. In one example embodiment, the mobile device 108 may compare the amplitude of a received scan signal to a predefined threshold during operation 208. In one example embodiment, the mobile device 108 may detect the scan signal if the amplitude of the scan signal exceeds a predefined threshold. In one example embodiment, the mobile device 108 may detect the scan signal if the amplitude of the scan signal equals or exceeds a predefined threshold.

In one example embodiment, the mobile device 108 may monitor for scan signals and may set a measured threshold to equal the largest measured amplitude of a received scan signal. In one example embodiment, the mobile device 108 may monitor for scan signals and may set a measured threshold to equal the largest measured amplitude of a scan signal multiplied by a multiplication factor. For example, the mobile device 108 may set the measured threshold to the largest measured amplitude of a scan signal multiplied by 0.85. In another example, the mobile device 108 may set the measured threshold to the largest measured amplitude of a scan signal multiplied by 1.10. In one example embodiment, the mobile device 108 may detect the scan signal if the amplitude of a scan signal exceeds the measured threshold. In one example embodiment, the mobile device 108 may detect the scan signal if the amplitude of the scan signal equals or exceeds the measured threshold.

Figure 6:
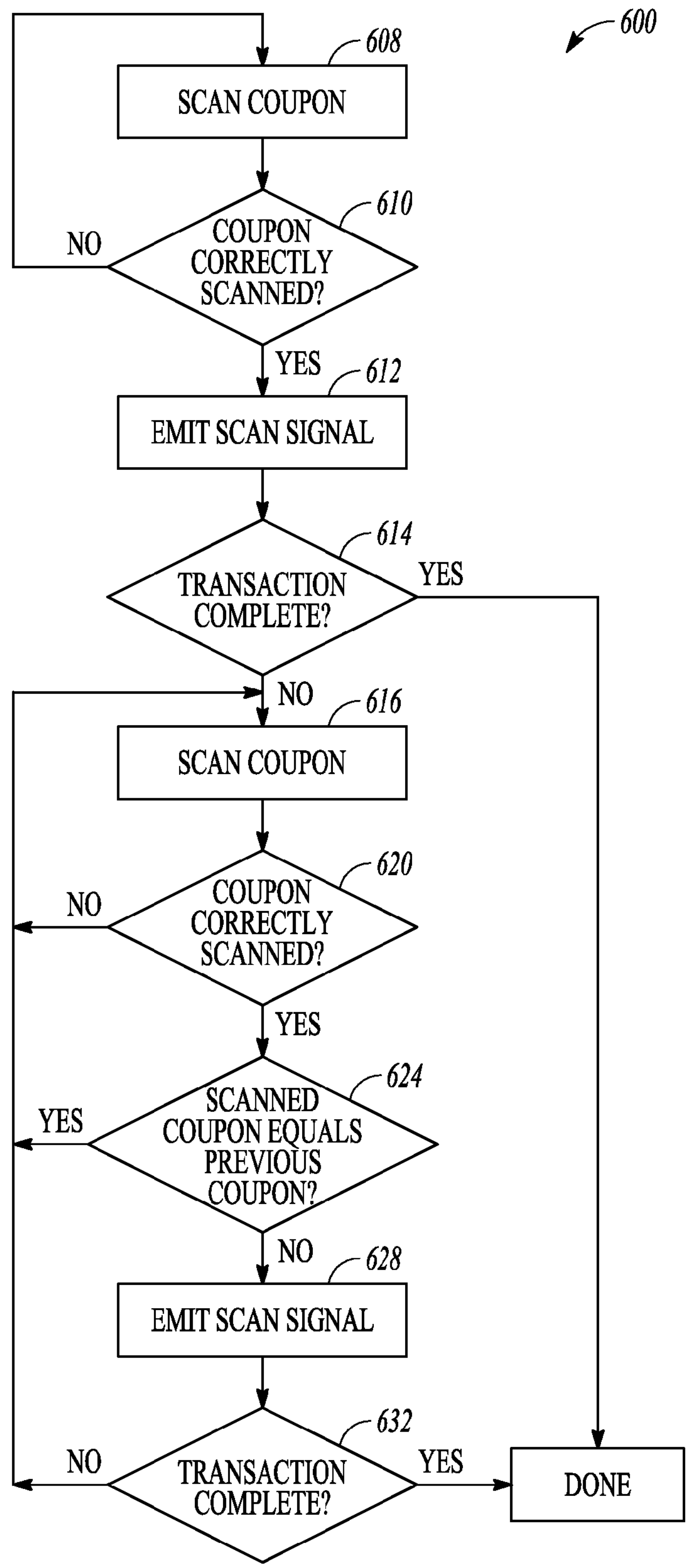
FIG. 6 is an example flowchart for a coupon scanning method, in accordance with an example embodiment.

FIG. 6 is an example flowchart for a coupon scanning method 600, in accordance with an example embodiment. In one example embodiment, a first coupon may be scanned by, for example, a point of sale terminal (operation 608). A test may then be performed to determine if the bar code (coupon) was correctly scanned (operation 610). If the bar code was not correctly scanned, the point of sale terminal may transition to operation 608 and rescan the bar code. If the bar code is scanned correctly, the point of sale terminal may emit a scan signal to indicate that the bar code has been scanned correctly and may process the read bar code (operation 612). A test may then be performed to determine if the transaction is complete (operation 614). For example, a buyer may press a button on the point of sale terminal to indicate that the transaction is complete. If the transaction is complete, the coupon scanning method may end. If the transaction is not complete, a transition to operation 616 may be performed and the point of sale terminal may scan another bar code. A test may then be performed to determine if the bar code (coupon) was correctly scanned (operation 620). If the bar code was not correctly scanned, the point of sale terminal may transition to operation 616 and rescan the bar code. If the bar code was correctly scanned, a test may be performed to determine if the currently read bar code equals the preceding read bar code (operation 624). If the currently read bar code equals the preceding read bar code, the point of sale terminal may return to operation 616 and scan for another bar code until the bar code is successfully read (operations 616-620). If a bar code other than the preceding read bar code is read, the point of sale terminal may emit a scan signal to indicate that the bar code has been scanned correctly and may process the read bar code (operation 628). In one example embodiment, the point of sale terminal may validate the coupon by, for example, checking the expiration date of the coupon. A test may then be performed to determine if the transaction is complete (operation 632). If the transaction is complete, the coupon scanning method may end. If the transaction is not complete, a transition to operation 616 may be performed and another coupon may be scanned. In one example embodiment, visual codes of items other than coupons may be scanned before and/or after the scanning of coupons.

Figure 7:
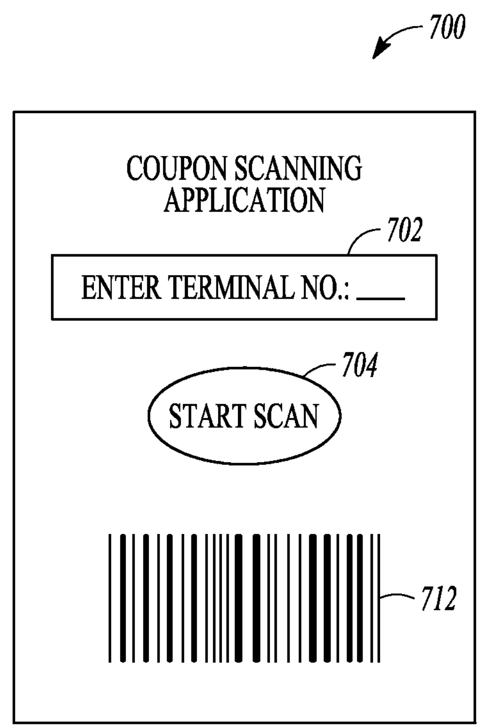
FIG. 7 is an example representation of a user interface for initiating the coupon displaying method, in accordance with an example embodiment.

FIG. 7 is an example representation of a user interface 700 for initiating the coupon displaying method, in accordance with an example embodiment. The user interface may be provided, for example, by mobile device 108. In one example embodiment, a user may optionally enter an identification number for a point of sale terminal via input field 702. A "Start Scan" button 704 is provided to enable a user to initiate the displaying of coupons. In response to a pressing of the "Start Scan" button 704, the first coupon 712 may be retrieved and displayed. The execution of the coupon displaying method may then proceed as described more fully above in regard to FIG. 5.

Although certain examples shown and described here, other variations exist and are within the scope of the invention. It will be appreciated by those of ordinary skill in the art that any arrangement which is designed or arranged to achieve the same purpose may be substituted for the specific embodiments shown. This application is intended to cover any adaptations or variations of the example embodiments of the invention described herein. It is intended that this invention be limited only by the claims, and the full scope of equivalents thereof.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
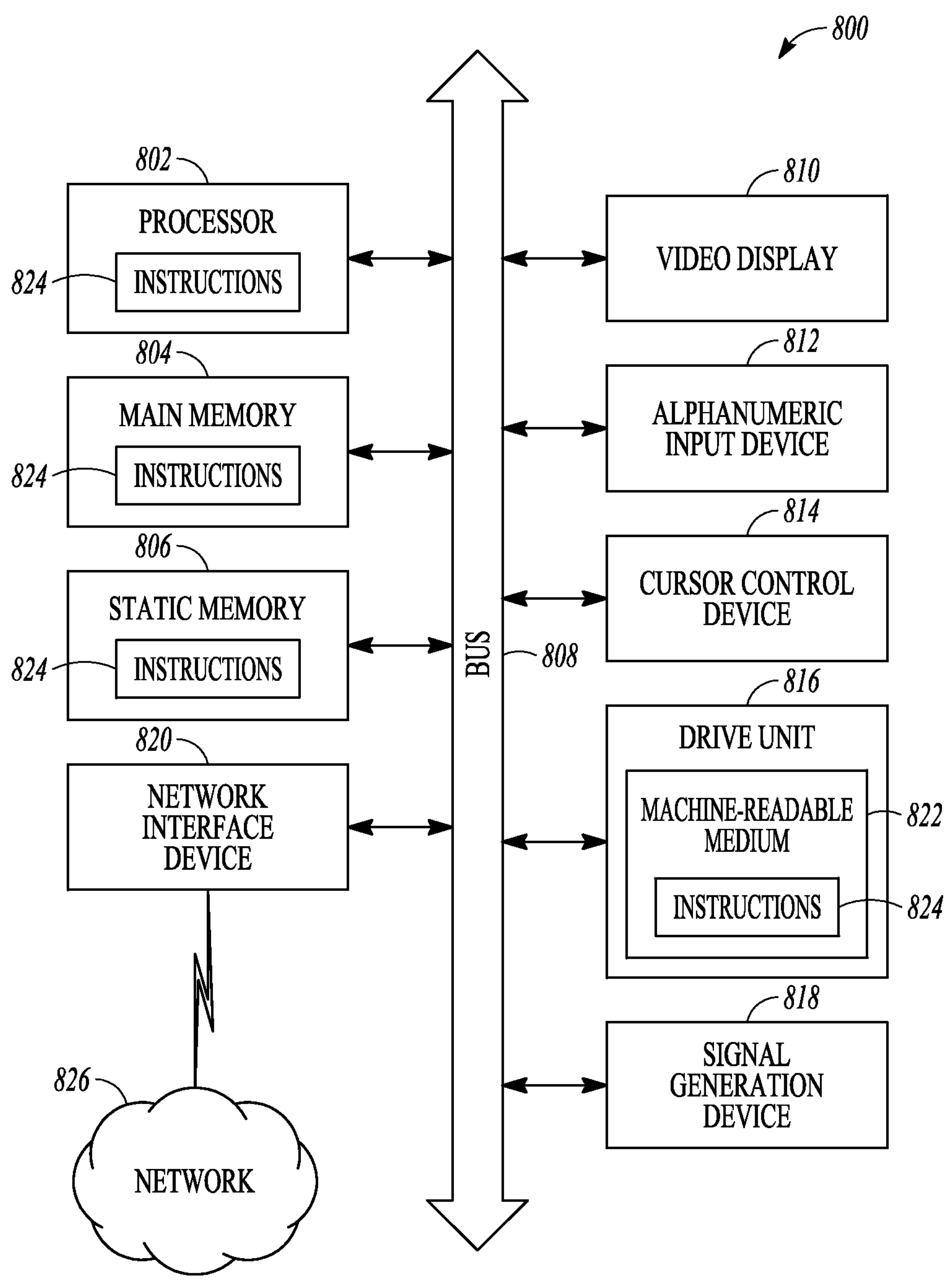
FIG. 8 is a block diagram of machine within which instructions may be executed for causing the machine to perform any one or more of the methodologies discussed herein, may be executed.

FIG. 8 is a block diagram of machine within which instructions may be executed for causing the machine to perform any one or more of the methodologies discussed herein, may be executed. In one example embodiment, the machine may be the mobile device 108. In one example embodiment, the machine may be the processing system 110. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media. Instructions may also reside within the static memory 806.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus to scan visual codes, the apparatus comprising:

a processor;

memory to store instructions that, when executed by the processor cause the processor to perform operations comprising:

capture an image of a first visual code marked on an item;

display, on an electronic screen of the apparatus, the image of the first visual code for a point-of-sale terminal that is enabled to scan the image of the first visual code;

monitor a scan signal during a specified period of time; and in response to an absence of a detection of the scan signal during the specified period of time, alter the display of the image of the first visual code, the scan signal indicates the image of the first visual code as scanned.

2. The apparatus of claim 1, wherein the instructions, when executed by the processor, further cause the processor to emit a scanning complete signal indicating that a set of scanning operations is complete.

3. The apparatus of claim 1, wherein the instructions, when executed by the processor, further cause the processor to measure an amplitude level of the scan signal and set a measured threshold.

4. The apparatus of claim 3, wherein the measured threshold is set to a value equal to a largest measured amplitude level of a received scan signal multiplied by a multiplication factor.

5. The apparatus of claim 3, wherein the detection of the scan signal comprises comparing an amplitude level of the scan signal and the measured threshold.

6. The apparatus of claim 1, wherein the detection of the scan signal comprises comparing an amplitude level of the scan signal and a predefined threshold level.

7. The apparatus of claim 1, wherein the altering of the display of the image of the first visual code includes altering one or more of: an intensity level of a display backlight, a color of the first visual code on the display, a contrast of the first visual code on the display, or a brightness of the first visual code on the display.

8. The apparatus of claim 1, wherein the altering of the display of the image of the first visual code includes includes altering a location or size of the first visual code on the display.

9. The apparatus of claim 1, wherein the instructions, when executed by the processor, further cause the processor to scan one or more product visual codes and store the one or more product visual codes as coupons in a coupon data structure.

10. A method to scan visual codes, comprising:

capturing an image of a first visual code marked on an item;

displaying, on an electronic screen of the apparatus, the image of the first visual code for a point-of-sale terminal that is enabled to scan the image of the first visual code;

monitoring a scan signal during a specified period of time; and in response to an absence of a detection of the scan signal during the specified period of time, altering the display of the image of the first visual code, the scan signal indicates the image of the first visual code as scanned.

11. The method of claim 10, further comprising emitting a scanning complete signal indicating that a set of scanning operations is complete.

12. The method of claim 11, wherein the altering of the display of the image of the first visual code includes includes altering a location or size of the first visual code on the display.

13. The method of claim 10, further comprising, on the user device, measuring an amplitude level of the scan signal and setting a measured threshold.

14. The method of claim 13, wherein the measured threshold is set to a value equal to a largest measured amplitude level of a received scan signal multiplied by a multiplication factor.

15. The method of claim 13, wherein the detection of the scan signal comprises comparing an amplitude level of the scan signal and the measured threshold.

16. The method of claim 10, wherein the detection of the scan signal comprises comparing an amplitude level of the scan signal and a predefined threshold level.

17. The method of claim 10, wherein the altering of the display of the image of the first visual code includes altering one or more of: an intensity level of a display backlight, a color of the first visual code on the display, a contrast of the first visual code on the display, or a brightness of the first visual code on the display.

18. The method of claim 10, further comprising scanning one or more product visual codes and storing the one or more product visual codes as coupons in a coupon data structure.

19. An apparatus for conveying visual codes, the apparatus comprising:

an image capture module, implemented using at least one of one or more hardware processors, for capturing an image of a first visual code marked on an item;

a code display module, implemented using at least one of the one or more hardware processors, for displaying, on an electronic screen of the apparatus, the image of the first visual code for a point-of-sale terminal that is enabled to scan the image of the first visual code;

monitoring a scan signal during a specified period of time; and in response to an absence of a detection of the scan signal during the specified period of time, altering the display of the image of the first visual code, the scan signal indicates the image of the first visual code as scanned.

20. A non-transitory computer-readable medium embodying instructions that, when executed by a processor perform operations comprising:

capturing an image of a first visual code marked on an item;

displaying, on an electronic screen of the apparatus, the image of the first visual code for a point-of-sale terminal that is enabled to scan the image of the first visual code;

monitoring a scan signal during a specified period of time; and in response to an absence of a detection of the scan signal during the specified period of time, altering the display of the image of the first visual code, the scan signal indicates the image of the first visual code as scanned.

* * * * *